United States Patent
Fischer et al.

(10) Patent No.: US 10,014,737 B2
(45) Date of Patent: Jul. 3, 2018

(54) ROTOR FOR AN ELECTRIC MACHINE

(71) Applicant: Siemens Aktiengesellschaft, München (DE)

(72) Inventors: Ralf Fischer, Nürnberg (DE); Korbinian Petermaier, München (DE); Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 342 days.

(21) Appl. No.: 14/848,979

(22) Filed: Sep. 9, 2015

(65) Prior Publication Data

US 2016/0072346 A1 Mar. 10, 2016

(30) Foreign Application Priority Data

Sep. 10, 2014 (EP) .................... 14184233

(51) Int. Cl.
*H02K 1/27* (2006.01)
*H02K 1/02* (2006.01)
*H02K 1/24* (2006.01)

(52) U.S. Cl.
CPC ............... *H02K 1/278* (2013.01); *H02K 1/02* (2013.01); *H02K 1/246* (2013.01)

(58) Field of Classification Search
CPC combination set(s) only.
See application file for complete search history.

(56) References Cited

U.S. PATENT DOCUMENTS

| 5,162,685 | A | * | 11/1992 | Yamaguchi | ............ | H02K 1/278 310/156.12 |
| 5,801,478 | A | | 9/1998 | Nashiki | | |
| 6,483,221 | B1 | | 11/2002 | Pawellek et al. | | |
| 6,803,690 | B2 | * | 10/2004 | Bosch | .................. | H02K 1/2726 310/154.21 |

(Continued)

FOREIGN PATENT DOCUMENTS

| DE | 10056556 A1 | 12/2001 |
| DE | 102007013090 A1 | 5/2008 |

(Continued)

OTHER PUBLICATIONS

Marongiu I. et al.; "Improved modeling of a distributed anisotropy synchronous reluctance machine"; Proceedings of the Industry Applications Society Annual Meeting, Dearborn; Proceedings of the Industry Applications Society Annual Meeting; New York; IEEE; pp. 238-243; vol. 1; XP032136356; DOI: 10.1109/IAS.1991.178161; ISBN: 978-0-7803-0453-6;: 1991;.

(Continued)

*Primary Examiner* — Tran Nguyen
(74) *Attorney, Agent, or Firm* — Henrey M. Feiereisen LLC (57) ABSTRACT

A rotor for an electric machine is mounted for rotation about an axis and includes a plurality of permanent magnets placed on a radial outer surface of the rotor for forming at least one magnetic pole pair. An anisotropically-soft sintered magnetic material having an easy direction and a hard direction is located in at least one section of the rotor radially further inward than the plurality of permanent magnets.

20 Claims, 3 Drawing Sheets

(56) References Cited

U.S. PATENT DOCUMENTS

| | | | |
|---|---|---|---|
| 6,858,960 B1* | 2/2005 | Muszynski | H02K 29/03 310/156.38 |
| 2005/0264122 A1* | 12/2005 | Domeki | H02K 1/278 310/156.46 |
| 2006/0219880 A1 | 10/2006 | Braun et al. | |
| 2007/0040466 A1 | 2/2007 | Vollmer | |
| 2007/0114861 A1 | 5/2007 | Bott et al. | |
| 2007/0170800 A1* | 7/2007 | Okubo | H02K 1/278 310/156.12 |
| 2007/0257566 A1 | 11/2007 | Vollmer | |
| 2007/0257575 A1 | 11/2007 | Vollmer | |
| 2008/0169718 A1 | 7/2008 | Bott et al. | |
| 2008/0185931 A1 | 8/2008 | Platen et al. | |
| 2008/0289440 A1 | 11/2008 | Denk et al. | |
| 2008/0315704 A1 | 12/2008 | Vollmer | |
| 2009/0009114 A1 | 1/2009 | Schunk et al. | |
| 2009/0015080 A1 | 1/2009 | Vollmer et al. | |
| 2009/0152959 A1 | 6/2009 | Vollmer | |
| 2009/0152976 A1 | 6/2009 | Bott et al. | |
| 2009/0160283 A1 | 6/2009 | Bott et al. | |
| 2009/0184602 A1 | 7/2009 | Braun et al. | |
| 2009/0251013 A1 | 10/2009 | Vollmer et al. | |
| 2009/0315424 A1 | 12/2009 | Vollmer | |
| 2010/0000830 A1 | 1/2010 | Budde et al. | |
| 2010/0013333 A1 | 1/2010 | Vollmer | |
| 2010/0133940 A1 | 6/2010 | Grossmann et al. | |
| 2010/0264770 A1 | 10/2010 | Braun et al. | |
| 2011/0006617 A1 | 1/2011 | Budde et al. | |
| 2011/0089782 A1* | 4/2011 | Jeung | H02K 1/278 310/156.46 |
| 2011/0241466 A1 | 10/2011 | Takahashi et al. | |
| 2012/0038228 A1 | 2/2012 | Vollmer | |
| 2013/0119816 A1 | 5/2013 | Yang et al. | |

FOREIGN PATENT DOCUMENTS

| | | |
|---|---|---|
| EP | 2704294 A1 | 3/2014 |
| GB | 1114562 A | 4/1965 |
| JP | H1155911 A | 2/1999 |
| JP | 4343281 B2 | 10/2009 |
| WO | WO 2013147157 A1 | 10/2013 |

OTHER PUBLICATIONS

Vollmer, Rolf, U.S. Pat. No. 6,628,031, Sep. 30, 2003, 2003-0011267, Jan. 16, 2003.
Duenisch et al., U.S. Pat. No. 6,885,187, Apr. 26, 2008, 2003-0094940, May 22, 2003.
Knauff et al., U.S. Pat. No. 6,768,238, Jul. 27, 2004, 2003-0173853, Sep. 18, 2003.
Mueller et al., U.S. Pat. No. 6,858,965, Feb. 22, 2005, 2004-0075359, Apr. 22, 2004.
Schunk et al, U.S. Pat. No. 6,812,612, Nov. 2, 2008, 2004-0084989, May 6, 2004.
Potoradi et al., U.S. Pat. No. 6,943,467, Sep. 13, 2005, 2004-0155539, Aug. 12, 2004.
Bott et al., U.S. Pat. No. 7,285,883, Oct. 23, 2007, 2004-0261553, Dec. 30, 2004.
Vollmer, Rolf, U.S. Pat. No. 7,141,905, Nov. 28, 2006, 2005-0231060, Oct. 20, 2005.
Huth et al., U.S. Pat. No. 7,564,158, Jul. 21, 2009, 2007-0035193, Feb. 15, 2007.
Erich Bott et al., U.S. Pat. No. 7,777,373, Aug. 17, 2010, 2008-0073985, Mar. 27, 2008.
Braun et al, U.S. Pat. No. 7,709,984, May 4, 2010, 2008-0164777, Jul. 10, 2008.
Schunk et al, U.S. Pat. No. 7,732,967, Jun. 8, 2010, 2008-0197741, Aug. 21, 2008.
Vollmer, Rolf, U.S. Pat. No. 7,705,507, Apr. 27, 2010, 2008-0197742, Aug. 21, 2008.
Bott et al, U.S. Pat. No. 7,755,315, Jul. 13, 2010, 2009-0039713, Feb. 12, 2009.
Vollmer, Rolf, U.S. Pat. No. 8,283,815, Oct. 9, 2012, 2009-0072634, Mar. 29, 2009.
Vollmer, Rolf, U.S. Pat. No. 7,915,777, Mar. 29, 2011, 2009-0206686, Aug. 20, 2009.
Bott et al., U.S. Pat. No. 8,063,517, Nov. 22, 2011, 2009-0212644, Sep. 27, 2009.
Vollmer, Rolf, 7,859,160, Dec. 28, 2010, 2009-0218904, Sep. 3, 2009.
Bott et al, U.S. Pat. No. 8,026,640, Sep. 27, 2011, 2009-0295236, Dec. 3, 2009.
Vollmer, Rolf et al, U.S. Pat. No. 7,977,826, Jul. 12, 2011, 2009-0295251, Dec. 3, 2009.
Budde et al, U.S. Pat. No. 8,035,371, Oct. 11, 2011, 2009-0302832, Dec. 10, 2009.
Grossmann et al., U.S. Pat. No. 8,227,951, Jul. 24, 2012, 2009-0322174, Dec. 31, 2009.
Vollmer, Rolf, 8,378,541, Feb. 19, 2013, 2010-0013332, Jan. 21, 2010.
Vollmer, Rolf, U.S. Pat. No. 8,115,360, Feb. 14, 2012, 2010-0013341, Jan. 21, 2010.
Vollmer, Rolf et al, U.S. Pat. No. 8,134,273, Mar. 13, 2012, 2010-0052466, Mar. 4, 2010.

* cited by examiner

ROTOR FOR AN ELECTRIC MACHINE

CROSS-REFERENCES TO RELATED APPLICATIONS

This application claims the priority of European Patent Application, Serial No. 14184133.6, filed Sep. 10, 2014, pursuant to 35 U.S.C. 119(a)-(d), the content of which is incorporated herein by reference in its entirety as if fully set forth herein.

BACKGROUND OF THE INVENTION

The invention relates to a rotor for an electric machine. More particularly, the invention relates to a rotor having a plurality of permanent magnets on its surface.

The following discussion of related art is provided to assist the reader in understanding the advantages of the invention, and is not to be construed as an admission that this related art is prior art to this invention.

The armature reaction in permanently excited synchronous machines adversely affects the saturation behavior of the electric machines, in particular: The armature reaction reduces the maximum output at a given maximum voltage, leads to an increased power requirement, and reduces the control dynamics. This leads to an increased demand for magnets with a high coercive field strength. To date, machines are constructed with comparatively thick magnets and comparatively large air gaps in order to keep the armature reaction low.

It would therefore be desirable and advantageous to provide an improved rotor for an electric machine to obviate prior art shortcomings.

SUMMARY OF THE INVENTION

According to one aspect of the present invention, a rotor for an electric machine is mounted for rotation about an axis and includes a plurality of permanent magnets placed on a radial outer surface of the rotor for forming at least one magnetic pole pair, and an anisotropically-soft sintered magnetic material having an easy direction and a hard direction and located in at least one section of the rotor radially further inward than the plurality of permanent magnets.

According to another aspect of the present invention, an electric machine includes a stator, and a rotor rotatable about an axis of rotation and mounted for magnetic interaction with the stator, the rotor having a radial outer surface and a plurality of permanent magnets placed on the radial outer surface of the rotor to form at least one magnetic pole pair, and an anisotropically-soft sintered magnetic material having an easy direction and a hard direction and located in the rotor, at least in one section thereof, radially further inward than the plurality of permanent magnets.

In accordance with the present invention, a sintered material having a soft magnetic anisotropy is arranged under the permanent magnets. At least one permanent magnet is provided for each respective magnetic pole. In the following description, the term "material" is to be understood to be magnetically soft if they have a coercive field strength of less than 100 kA/m. Soft magnetic anisotropy provides different magnitudes of magnetic permeability in different directions. A soft magnetic anisotropic material will exhibit a higher magnetic permeability along its so-called "easy" direction than along its so-called "hard" direction.

Advantageously, the softly magnetic anisotropic sintered material has a suitably high saturation flux density. The easy direction of the sintered material is substantially perpendicular to the hard direction, at an angle between the easy and the hard directions of 75° to 90° also being possible, an angle of 50° to 90° in particular. This angular range also applies to other instances in which two directions are "substantially perpendicular" to one another.

An electric machine in accordance with the invention can be operated to provide an electrical output into the kilowatt range. In particular, it is possible to operate the electric machine at an electrical output that is several times 10 kW.

In particular, the combination of the plurality of permanent magnets on the radial outer surface of the rotor, and the anisotropically-soft sintered magnetic material located radially inward from the permanent magnets, gives rise to a range of advantages. Using an appropriate arrangement of the permanent magnets and the softly anisotropic sintered magnetic material, and an appropriate arrangement of its easy direction and its hard direction in a particularly advantageously manner, in particular, the resulting magnetic flux can be influenced so that armature reaction is reduced, relative to the armature reaction in conventional machines.

The comparatively low armature reaction advantageously reduces the apparent power requirement. Also, the power factor cos(phi) is greater than in conventional machines. Therefore the lower armature reaction makes it possible for a smaller converter to be used to feed the machine, for example.

A further advantage of the invention is that the comparatively low armature reaction reduces the opposing magnetic field load on the permanent magnets. This enables the use of thinner permanent magnets and permanent magnets having a lower coercive field strength. In particular, more cost-effective permanent magnets having a reduced heavy rare earth (HRE) content can be used, because of the comparatively low coercive field strength required. Furthermore, in contrast to similar known electric machines, the anisotropically-soft magnetic material is a sintered material. This makes it possible to also use source materials that can otherwise only be combined with great difficulty to form a new material, if at all, for example.

In cross section, the anisotropically-soft sintered magnetic material that is arranged below a respective permanent magnet in the radial direction can advantageously extend along at least half the extent of the respective permanent magnet in the circumferential direction. Advantageously, the anisotropically-soft sintered magnetic material may extend along the entire length of the respective permanent magnet in the circumferential direction, and possibly even beyond that.

According to another advantageous feature of the present invention, the anisotropically-soft sintered magnetic material and the plurality of permanent magnets can be arranged such that a respective d-magnetic flux along a respective d-axis is strengthened and a respective q-magnetic flux along a respective q-axis is weakened. The d-axis and q-axis are also referred to as the direct axis and the quadrature axis, respectively. The magnetic flux that exists or is expected during the operation of the electric machine along the d-axis and the q-axis, respectively, can be broken down into a d-magnetic flux and a q-magnetic flux component, respectively, with great difficulty. As is known, the d-magnetic flux correlates with the torque.

On a cross-section through a rotor perpendicular to the axis of rotation of that rotor, a d-axis is located along a respective straight line on which the axis of rotation and the respective magnetic pole lie, as a rule. Correspondingly, the respective q-axis is arranged along a straight line that includes the axis of rotation and the center between two adjacent magnetic poles, as a rule. In a particular embodiment of the rotor, the position of the respective d-axis and q-axis, however, can also deviate from this.

In accordance with the invention, the d-magnetic flux is strengthened and the respective q-magnetic flux is weakened in the rotor. The respective d-magnetic flux is strengthened by the at least one permanent magnet having the respective magnetic pole. Strengthening and/or weakening relates here to a rotor having a comparable soft magnetic material, but one that does not exhibit any magnetic anisotropy.

The weakening of the respective q-magnetic flux accompanies an increase in magnetic resistance to the q-magnetic flux. This permits the quadrature-axis armature field to be formed less strongly, so that that the iron circuit is less saturated and, in particular, the linearity of torque and current is improved. The result is that better control behavior and higher torques are achievable. Furthermore, higher magnetic resistance to q-magnetic flux lowers the quadrature inductance Lq and the voltage drop caused by the quadrature reactance is lower, which means that a higher current can be driven at the voltage limit, and higher outputs, higher torques, are possible.

According to another advantageous feature of the present invention, the easy direction of the anisotropically-soft sintered magnetic material can be oriented substantially along a respective d-axis, at least in one section. Advantageously, there is an angle of 0° between the easy direction and the respective d-axis and/or the corresponding d-magnetic flux that exists and/or is expected during operation of the electric machine.

The expected and/or existing d-magnetic flux can be determined for the rotor by measurement, calculation or simulation, for example. Within the scope of the present invention, the easy direction will, however, also be deemed to be oriented substantially along the respective d-axis if there is an angle of 0° to 15° between them, or of 0° to 40° in particular, between the easy direction and the respective d-axis and/or the corresponding d-magnetic flux. This angular range, referred to below as the "particular" angle, may also be applicable in instances in which two directions are oriented substantially parallel to one another or one direction is oriented substantially in some other direction.

Advantageously, an orientation of the easy direction of the anisotropically-soft sintered magnetic material that lies substantially along the respective d-axis reduces magnetic resistance to the d-magnetic flux relative to materials having no magnetic anisotropy. The resulting increased d-magnetic flux makes a higher torque possible.

Alternatively, or additionally, the hard direction of the anisotropically-soft sintered magnetic material may advantageously be oriented substantially perpendicular to the respective d-axis, at least in one section.

According to another advantageous feature of the present invention, the easy direction of the anisotropically-soft sintered magnetic material can be oriented substantially perpendicular to a respective q-axis, at least in one section.

Between the easy direction and the respective q-axis and/or the corresponding q-magnetic flux that exists and/or is expected during operation of the electric machine, there is advantageously an angle of 90°, in particular of 75° to 90° and/or of 50° to 90°, which angle is referred to hereinafter as the "specified" easy angle.

According to another advantageous feature of the present invention, the easy direction of the anisotropically-soft sintered magnetic material can be oriented substantially perpendicular to the respective q-axis, at least in one section. This increases magnetic resistance to the q-magnetic flux relative to materials having no magnetic anisotropy. Increased q-magnetic flux provides a lower armature reaction.

Alternatively, or additionally, the hard direction of the anisotropically-soft sintered magnetic material may be oriented substantially along a respective q-axis, at least in one section.

According to another advantageous feature of the present invention, the anisotropically-soft sintered magnetic material and the plurality of permanent magnets can be arranged such that the easy direction of the anisotropically-soft sintered magnetic is substantially perpendicular to a respective q-magnetic flux. This is realized in particular at the place where the respective q-magnetic flux penetrates the anisotropically-soft sintered magnetic material and/or the rotor.

According to another advantageous feature of the present invention, the anisotropically-soft sintered magnetic material and the plurality of permanent magnets can be arranged such that the specified angle exists only at the place where the respective q-magnetic flux penetrates the anisotropically-soft sintered magnetic material and/or the rotor. In particular, when the rotor has either the permanent magnets or the anisotropically-soft sintered magnetic material constantly on its radial outer surface, the place where the respective q-magnetic flux penetrates the anisotropically-soft sintered magnetic material and the place where the respective q-magnetic flux penetrates the rotor are, as a rule, identical, and so, the specified angle will exist at this place.

However, optionally, when the rotor has at least one other area on its radial outer surface that contains anisotropically-soft sintered magnetic material, in addition to areas containing the permanent magnets, then the specified angle advantageously exists at the place where the respective q-magnetic flux penetrates the anisotropically-soft sintered magnetic material. Additionally, or alternatively, the specified angle can also be observed at the place where the respective q-magnetic flux penetrates the rotor and/or the respective other area on its radial outer surface. Preferably, in a rotor having at least one other area of this type, at least the majority of the respective q-magnetic flux penetrates the anisotropically-soft sintered magnetic material at the specified angle.

Furthermore, the anisotropically-soft sintered magnetic material and the plurality of permanent magnets can be arranged such that the specified angle can be constantly observed along the occurring and/or expected respective q-magnetic flux within the anisotropically-soft sintered magnetic material. For example, the expected and/or existing q-magnetic flux can be determined for the rotor by measurement, calculation or simulation. In particular, the anisotropically-soft sintered magnetic material can be configured such that the easy direction is at the specified angle to the determined q-magnetic flux along all or most of the path of the determined q-magnetic flux through the anisotropically-soft sintered magnetic material.

The anisotropically-soft sintered magnetic material can advantageously be arranged along all or most of the path of the determined q-magnetic flux through the rotor. The anisotropically-soft sintered magnetic material is also preferably arranged along all or most the place at which the respective q-magnetic flux emerges from the anisotropically-soft sintered magnetic material and/or from the rotor.

Advantageously, the easy direction of the anisotropically-soft sintered magnetic material may be substantially perpendicular to the respective q-magnetic flux. The resulting increase in the magnetic resistance to the q-magnetic flux, in comparison to materials having no magnetic anisotropy, results in reduced q-magnetic flux producing a reduced armature reaction. Alternatively, or additionally, the hard direction of the anisotropically-soft sintered magnetic material may be oriented substantially along a respective q-magnetic flux.

According to another advantageous feature of the present invention, the anisotropically-soft sintered magnetic material and the plurality of permanent magnets may be arranged such that the easy direction of the anisotropically-soft sintered magnetic material is substantially parallel to the respective d-magnetic flux. Advantageously, the easy direction of the anisotropically-soft sintered magnetic material may be substantially parallel to the respective d-magnetic flux at the place where the respective d-magnetic flux penetrates the anisotropically-soft sintered magnetic material.

Between the easy direction and the respective d-magnetic flux that exists and/or is expected during operation of the electric machine, there thus lies advantageously an angle of 0°, in particular of 0° to 15° and/or of 0° to 40°, as noted above, referred to as the "particular" angle.

According to another advantageous feature of the present invention, the anisotropically-soft sintered magnetic material and the plurality of permanent magnets may be arranged such that the specified angle exists only at the place where the respective d-magnetic flux or a majority of the respective d-magnetic flux penetrates the anisotropically-soft sintered magnetic material. As a rule, the permanent magnets are arranged such that the respective d-magnetic flux or a majority of the respective d-magnetic flux penetrates the rotor via the permanent magnets and is then continued radially inwardly into the anisotropically-soft sintered magnetic material. The specified angle should thus apply in particular at the place where the respective d-magnetic flux or a majority of the respective d-magnetic flux penetrates the anisotropically-soft sintered magnetic material.

Furthermore, the anisotropically-soft sintered magnetic material and the plurality of permanent magnets can be arranged such that the specified angle can be observed constantly along the respective d-magnetic flux occurring and/or expected within the anisotropically-soft sintered magnetic material. For example, the expected and/or existing d-magnetic flux can be determined for the rotor in particular by measurement, calculation or simulation, the anisotropically-soft sintered magnetic material being configured such that in particular along all or most of the path of the determined d-magnetic flux through the anisotropically-soft sintered magnetic material the easy direction is at the specified angle to the determined d-magnetic flux. The anisotropically-soft sintered magnetic material can, advantageously, be configured such that it is arranged along all or most of the path of the determined d-magnetic flux through the rotor. The same applies to the place at which the respective d-magnetic flux emerges from the anisotropically-soft sintered magnetic material.

According to another advantageous feature of the present invention, the easy direction of the anisotropically-soft sintered magnetic material can be substantially parallel to the respective d-magnetic flux and, thus, reduces magnetic resistance to the d-magnetic flux in comparison to materials having no magnetic anisotropy. The resulting increased d-magnetic flux results in a higher achievable torque.

According to another advantageous feature of the present invention, the rotor can have a substantially cylindrical inner part that includes a soft magnetic material or an amagnetic material, and the anisotropically-soft sintered magnetic material can be arranged along a respective d-axis toward the inner part, starting from the at least one permanent magnet of the respective magnetic pole, the easy direction of the anisotropically-soft sintered magnetic material being oriented substantially along the respective d-axis.

The inner part may have a laminated core made of customary electrical sheet, with the sheets being stacked in an axial direction for example. The inner part may also have a central throughbore such that the inner part is substantially a hollow cylinder.

At least one permanent magnet can be provided for each respective magnetic pole, the respective d-axis being arranged along a respective straight line on which the axis of rotation and the respective magnetic pole lie, as a rule. The anisotropically-soft sintered magnetic material, having an easy direction oriented substantially along a respective d-axis, can be arranged radially inwardly from a respective permanent magnet. For each magnetic pole, a separate area containing the anisotropically-soft sintered magnetic material can be provided. The easy direction will be deemed to be oriented substantially along the respective d-axis if there is an angle of 0° or of 0° to 15°, in particular of 0° to 40°, between the easy direction and the respective d-axis, referred to herein as the "particular" angle.

Thus, overall, the result for the respective magnetic pole is to have an easy direction of the anisotropically-soft sintered magnetic material pointing substantially in a radial direction. In particular, the easy direction of the respective area of the anisotropically-soft sintered magnetic material assigned to a respective magnetic pole is parallel to the radial direction in relation to the center of the respective area, viewed in a circumferential direction.

This arrangement of the anisotropically-soft sintered magnetic material relative to the at least one permanent magnet of the respective magnetic pole, provides good conduction of the d-magnetic flux along a respective path within the rotor that has comparatively low magnetic resistance. This makes achievement of comparatively high torques possible.

Advantageously, a gap between the respective magnets of two adjacent magnetic poles in the circumferential direction remains; in particular, one that extends in a radial direction as far as the substantially cylindrical inner part. One area containing the anisotropically-soft sintered magnetic material is thus formed for each respective magnetic pole. Each two adjacent areas are, therefore, separated from one another by a respective gap. The magnetic poles thus project in a radial direction out of the rotor, whereas the gaps respectively constitute a type of radial gap in the rotor.

The afore-described gaps produce a further reduction in the respective q-magnetic flux in the rotor. This is caused by a reduced magnetic permeability for the respective q-magnetic flux in given areas within the rotor on the one hand, and on the other hand, by an enlarged air gap in comparison to the respective magnetic pole.

In an alternative advantageous embodiment of the invention, the rotor can have an inner part that includes a soft magnetic material or an amagnetic material, the inner part having in an n-pole rotor substantially the cross section of a 2n-cornered polygon, where n is greater than or equal to four, the 2n-cornered polygon being substantially a regular, n-cornered polygon having n corners that have each been replaced by bevels such that the 2n-cornered polygon has n long sides and n short sides. The anisotropically-soft sintered magnetic material is arranged along a respective d-axis toward a respective long side of the inner part, starting from the at least one permanent magnet of the respective magnetic pole. The easy direction of the anisotropically-soft sintered magnetic material is oriented substantially along the respective d-axis.

For a four-pole rotor, the inner part thus has the cross section of an octagon. The polygon is substantially a regular, n-cornered polygon, the corners of the polygon having been replaced by bevels. The polygon thus has n long sides and n short sides, the short sides preferably corresponding to the n bevels.

The plurality of permanent magnets for the respective magnetic pole and the respectively-assigned areas where the anisotropically-soft sintered magnetic material is located can be arranged outwardly as an extension of the n long sides of the polygon, while the gaps between the magnetic poles that are described above are located on the n short sides. Provision can also be made for arranging the plurality of permanent magnets and the respectively assigned anisotropically-soft sintered magnetic material as an outward extension of the n short sides, in principle.

Since this exemplary embodiment of the rotor has many similarities to the rotor of the preceding embodiment, with regard to the magnetic flux in particular, reference is made to the discussion of the preceding exemplary embodiment for further details.

According to another alternative advantageous feature of the present invention, the rotor that can have an inner part which includes a soft magnetic material or an amagnetic material, the inner part, viewed perpendicular to the axis of rotation, having in an n-pole rotor a cross section that is substantially a regular n-cornered polygon, wherein n is greater than or equal to four, the inner part being arranged such that a respective first connecting line from the axis of rotation to a respective vertex of the polygon of the inner part is, oriented substantially along the respective d-axis, when viewed perpendicular to the axis of rotation. The at least one permanent magnet of the respective magnetic pole, when viewed perpendicular to the axis of rotation, can be arranged radially outwardly from a respective vertex of the polygon of the inner part. The anisotropically-soft sintered magnetic material can be arranged radially outwardly from a respective radially outer surface of the inner part, the anisotropically-soft sintered magnetic material extending in a radial direction as far as the at least one permanent magnet of the respective magnetic pole. The easy direction of the anisotropically-soft sintered magnetic material between two adjacent vertices can be oriented substantially along a respective second connecting line that connects the two adjacent vertices.

The inner part can have a laminated core made of conventional electrical sheet, for example, the sheets being stacked in an axial direction. The inner part can also have a central throughbore. In a rotor having two pole pairs, i.e. four magnetic poles, the cross section of the inner part can be substantially a square, while in an n-pole rotor the cross section provides a substantially regular n-sided polygon as the inner part. Correspondingly, the cross section of the inner part of a rotor having three or four pole pairs is a substantially regular hexagon or octagon, respectively.

In the presence of a square cross-section in a four-pole rotor, the inner part can be arranged such that the respective vertices of the square, viewed from the axis of rotation, are each oriented along a respective d-axis. As the respective d-axis is, as a rule, arranged along a respective straight line that includes the axis of rotation and a respective magnetic pole, the at least one permanent magnet of the respective magnetic pole is also arranged radially outwardly from the respective vertex of the inner part. The same applies to rotors having more than four poles.

Furthermore, the anisotropically-soft sintered magnetic material may be arranged outwardly from the respective outer surface of the inner part, extending in a radial direction as far as the respective permanent magnet. For the respective outer surface of the inner part, the area containing the anisotropically-soft sintered magnetic material thus has substantially the cross section of a segment of a circle, when viewed in a cross section through the axis of rotation. The respective circle segment is delimited radially inwardly by an outer surface of the inner part that represents a respective chord of the circle. Radially outwardly, the respective circle segment is enclosed by the respective permanent magnet and/or the surface of the rotor. The easy direction of the anisotropically-soft sintered magnetic material located in each of the circle segments is oriented substantially along the respective circle chord. Thus, the respective easy direction is substantially perpendicular to a respective angle bisector between two adjacent magnetic poles. This arrangement of the easy direction substantially perpendicular to a respective angle bisector between two adjacent magnetic poles, ensures that the d-magnetic flux of at least one permanent magnet of a respective magnetic pole that enters or exits the rotor, can be routed through the rotor with low loss.

This low loss is achieved because the anisotropically-soft sintered magnetic material provides a connecting path from the respective magnetic pole to an adjacent magnetic pole. The rotor has a high magnetic permeability along that connecting path thanks to the anisotropically-soft sintered magnetic material and the orientation of its easy direction. At the same time, such an arrangement impedes penetration of the respective q-magnetic flux into the rotor, as the easy and hard direction of the anisotropically-soft sintered magnetic material are oriented substantially perpendicular and parallel to the expected q-magnetic flux, respectively.

According to another advantageous feature of the present invention, a respective pole area having anisotropically-soft sintered magnetic material can be provided that lies radially inward from the at least one permanent magnet of the respective magnetic pole. The easy direction of the anisotropically-soft sintered magnetic material in the respective pole area can be oriented substantially along the respective d-axis. An intermediate area having the anisotropically-soft sintered magnetic material can also be provided between two consecutive pole areas along the circumference of the rotor. The easy direction of the anisotropically-soft sintered magnetic material of each respective intermediate area is oriented substantially perpendicular to the respective q-axis.

At least one respective permanent magnet is provided, for each of the magnetic poles. As a rule, the respective d-axis is arranged along a respective straight line on which the axis of rotation and a respective magnetic pole lie. Radially inward from the respective permanent magnet, a respective pole area containing the anisotropically-soft sintered magnetic material is provided. The easy direction of the pole areas containing the anisotropically-soft sintered magnetic material is oriented substantially along the respective d-axis, that is, having an angle of 0° or of 0° to 15°, in particular of 0° to 40°, between the easy direction and the respective d-axis, referred to herein as the "particular" angle. Overall, for each respective pole area, the result is thus that the easy direction of the anisotropically-soft sintered magnetic material points substantially in a radial direction. In a particular embodiment, it may be parallel to the radial direction in relation to the center of the respective pole area, when viewed in the circumferential direction.

An intermediate area containing the anisotropically-soft sintered magnetic material can be arranged between two adjacent pole areas respectively. The easy direction of the anisotropically-soft sintered magnetic material in each respective intermediate area can be oriented substantially perpendicular to the respective q-axis. That is, there is an angle of 90° or of 75° to 90°, in particular of 50° to 90°, between the respective q-axis and the respective easy direction.

Alternatively or additionally, in accordance with the invention, the hard direction of the anisotropically-soft sintered magnetic material of the respective intermediate area may be oriented substantially along the respective q-axis such that an angle of 0° or of 0° to 15°, in particular of 0° to 40°, referred to herein as the "particular" angle, lies between the respective q-axis and the respective hard direction.

Respective easy and hard directions of the pole areas and of the intermediate areas, oriented in the manner described above, offers the respective d-magnetic flux a path through the rotor that has comparatively high magnetic permeability, whereas it offers the respective q-magnetic flux a path through the rotor that has comparatively low magnetic permeability. Thus, the respective d-magnetic flux is strengthened and the respective q-magnetic flux is weakened.

The respective intermediate area can advantageously extend outward in a radial direction less far than the respective pole area, the respective permanent magnets in particular. Consequently, in accordance with the invention, the intermediate area provides a respective groove in a circumferential direction between respective pole areas. The magnetic poles thus project in a radial direction out from the rotor, whereas the grooves form an indentation in the rotor. As explained above, these grooves in a rotor produce a further reduction in the respective q-magnetic flux, caused on the one hand by the reduced magnetic permeability for the respective q-magnetic flux within the rotor and, on the other hand, by an enlarged air gap relative to the respective magnetic pole.

According to another advantageous feature of the present invention, the anisotropically-soft sintered magnetic material can include one or more wire bundles. The easy direction can advantageously be oriented along the wire bundle, and the hard direction can be perpendicular to the wire bundle. The wire bundle enables the particular routing of the respective d-magnetic flux along the respective wire bundle to be targeted. On the other hand, a respective q-magnetic flux perpendicular to a respective wire bundle is weakened particularly effectively.

According to another advantageous feature of the present invention, the anisotropically-soft sintered magnetic material can have a saturation flux density of at least 1 T. Alternatively or additionally the anisotropically-soft sintered magnetic material can also have a coercive field strength of maximally 10 kA/m, a maximum of 1 kA/m, in particular.

These properties of the anisotropically-soft sintered magnetic material enable the use of comparatively cost-effective permanent magnets with a reduced heavy rare earth content, in particular, while nonetheless enabling the generation of sufficiently high torque.

According to another advantageous feature of the present invention, the magnetic permeability $\mu r_L$ of the anisotropically-soft sintered magnetic material along the easy direction can be at least one order of magnitude, advantageously at least two orders of magnitude, greater than the magnetic permeability $\mu r_S$ of the anisotropically-soft sintered magnetic material along the hard direction, $\mu r_L$, wherein in particular the magnetic permeability is greater than 20 and the magnetic permeability $\mu r_S$ is less than 1.6.

In accordance with the invention, the anisotropically-soft sintered magnetic material provides a particularly advantageous embodiment of the rotor wherein the strengthening of d-magnetic flux and weakening q-magnetic flux are particularly pronounced.

The easy direction and the hard direction can, advantageously, be oriented perpendicular to one another, substantially at an angle of 90°, specifically with an angle of 75° to 90° or of 50° to 90°, between the easy direction and the hard direction.

According to another advantageous feature of the present invention, the anisotropically-soft sintered magnetic material can include neodymium-iron-boron, soft magnetic neodymium-iron-boron, in particular.

According to another advantageous feature of the present invention, the rotor may have a hollow shaft.

BRIEF DESCRIPTION OF THE DRAWINGS

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
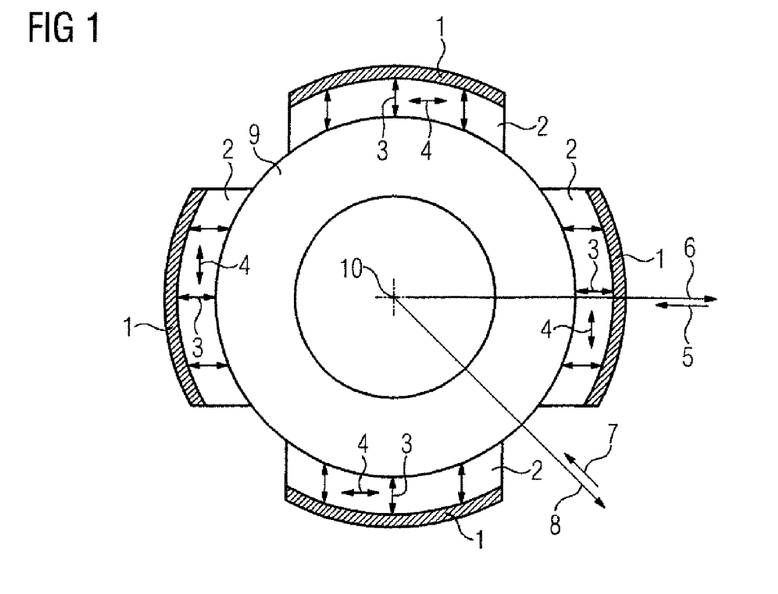
FIG. 1 is a cross section view of a first exemplary embodiment of a rotor according to the invention.

FIG. 1 shows a cross section of a first exemplary embodiment of the rotor according to the invention. The rotor is rotatable about an axis of rotation 10 and has on its radial outer surface a plurality of permanent magnets 1 for forming two magnetic pole pairs. Radially further inward from the plurality of permanent magnets 1, the rotor has an anisotropically-soft sintered magnetic material 2 having an easy direction 3 and a hard direction 4. Within the exemplary embodiment, a separate area contains the anisotropically-soft sintered magnetic material 2 for each magnetic pole.

The rotor shown in FIG. 1 has a d-axis 6 and a q-axis 8 for a respective magnetic pole, also referred to as a "direct axis" and a "quadrature axis". The magnetic flux that exists during operation of the corresponding electric machine along the respective d-axis and q-axis can be specified as the d-magnetic flux component and the q-magnetic flux component, respectively.

Materials which, on the one hand, have a coercive field strength that is less than 100 kA/m and, on the other hand, have a higher magnetic permeability along their easy direction 3 than along their hard direction 4, can be used as anisotropically-soft sintered magnetic materials 2. The hard direction 4 of the anisotropically-soft sintered magnetic materials is preferably substantially perpendicular to the easy direction 3. Furthermore, in a particularly advantageous embodiment of present invention, the anisotropically-soft sintered magnetic material can include one or more wire bundles, with the easy direction 3 oriented along a wire bundles and the hard direction 4 perpendicular to the wire bundles. The wire bundles are then particularly effective in conducting the d-magnetic flux 6 but weakening the q-magnetic flux 8 that is perpendicular to the respective wire bundle, as previously noted.

The rotor in FIG. 1 also has a substantially cylindrical inner part 9 that comprises a soft magnetic or an amagnetic material. For example, the inner part 9 can be a hollow cylinder that can receive a hollow shaft. The anisotropically-soft sintered magnetic material 2 is arranged, starting from the respective permanent magnet(s) of the respective magnetic pole, along the respective d-axis toward the cylindrical inner part 9. The easy direction 3 of the anisotropically-soft sintered magnetic material 2 is oriented substantially along the respective d-axis 6.

In particular, the anisotropically-soft sintered magnetic material 2 and die plurality of permanent magnets 1 are arranged such that the respective d-magnetic flux 5 along the respective d-axis 6 is strengthened and the respective q-magnetic flux 7 along the respective q-axis 8 is weakened.

In FIG. 1, a gap remains between the respective permanent magnets of two adjacent magnetic poles, the respective gap extending in a radial direction as far as the cylindrical inner part 9. Thus, the magnetic poles project in a radial direction out from the rotor, while the gaps represent an indentation in the circumference of the rotor.

Figure 2:
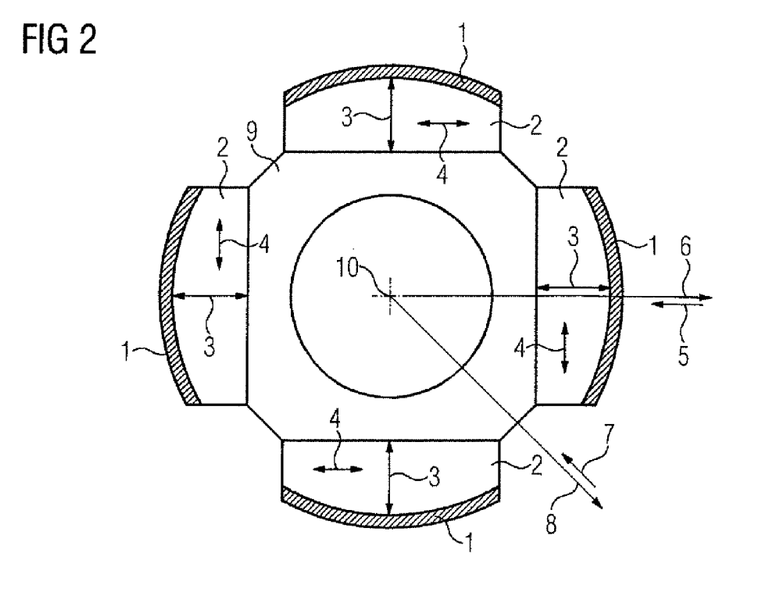
FIG. 2 is a cross section view of a second exemplary embodiment of a rotor according to the invention.

FIG. 2 shows a cross section of a second exemplary embodiment of a rotor in accordance with the invention. This second exemplary embodiment has some similarities to the first exemplary embodiment. The major differences are explained below using the same reference numerals used in FIG. 1 to designate items that are the same.

In contrast to the first exemplary embodiment, the inner part 9 of the second exemplary embodiment has an octagonal cross section. The octagon is substantially square, but the corners of the square have been replaced by bevels. Consequently, that octagonal inner part 9 has four long sides and four short sides, the short sides corresponding to the four bevels.

The plurality of permanent magnets 1 having respective magnetic poles and the respectively anisotropically-soft sintered magnetic material 2 at each pole is arranged as an outward extension of the four long sides. In contrast, the gaps between the magnetic poles described above, are on the four short sides of the inner part 9.

Figure 3:
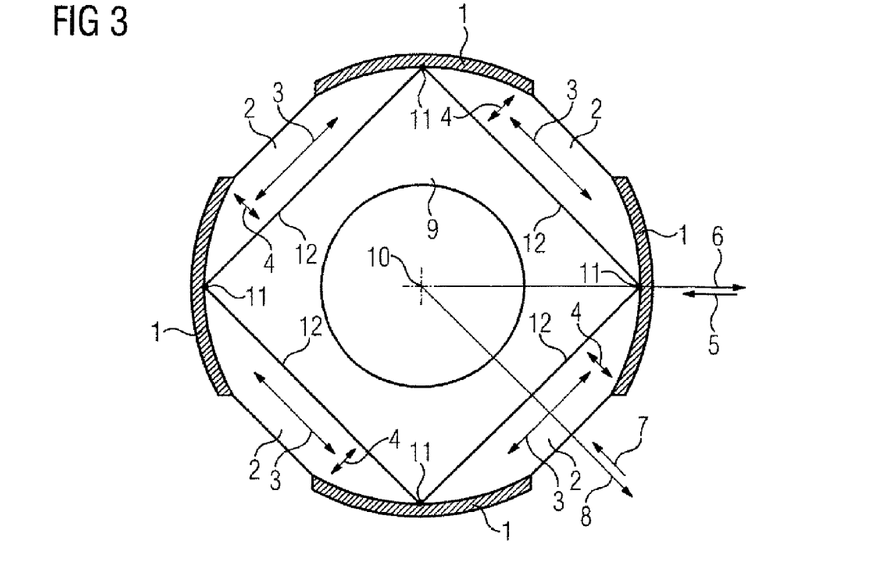
FIG. 3 is a cross section view of a third exemplary embodiment of a rotor according to the invention.

FIG. 3 shows a cross section of a third exemplary embodiment of a rotor according to the invention. The rotor is rotatable about an axis of rotation 10 and has a plurality of permanent magnets 1 on its radial outer surface for forming two magnetic pole pairs. The rotor has, radially inward from the plurality of permanent magnets 1, an anisotropically-soft sintered magnetic material 2 having an easy direction 3 and a hard direction 4.

Furthermore, the rotor has an inner part 9 comprising a soft magnetic material or an amagnetic material. The inner part 9 in FIG. 3 may also have a bore running along the axis of rotation 10 for receiving a hollow shaft for example. Viewed in a cross section perpendicular to the axis of rotation 10, the inner part 9 for the present four-pole rotor has substantially a square the cross section, i.e. a regular four-cornered polygon.

In FIG. 3, the inner part 9 is arranged such that a respective first connecting line from the axis of rotation 10 to a respective vertex 11 of the square of the inner part 9 is oriented substantially along the respective d-axis 6. The permanent magnet 1 of a respective magnetic pole, seen in a cross section perpendicular to the axis of rotation 10, is located radially outward from the respective vertex 11 of the inner part 9.

The anisotropically-soft sintered magnetic material 2 is arranged radially outwardly from a respective radial outer surface 12 of the inner part 9, the anisotropically-soft sintered magnetic material 2 extending in a radial direction to the at least one permanent magnet 1 of the respective magnetic pole. The easy direction 3 of the anisotropically-soft sintered magnetic material 2 between two adjacent vertices 11 is oriented respectively substantially along a respective second connecting line which connects the two adjacent vertices 11.

The easy direction 3 of the anisotropically-soft sintered magnetic material 2 between two adjacent magnetic poles is thus preferably oriented substantially perpendicular to the respective q-axis, whereas the hard direction 4 is oriented substantially parallel to the respective q-axis.

Figure 4:
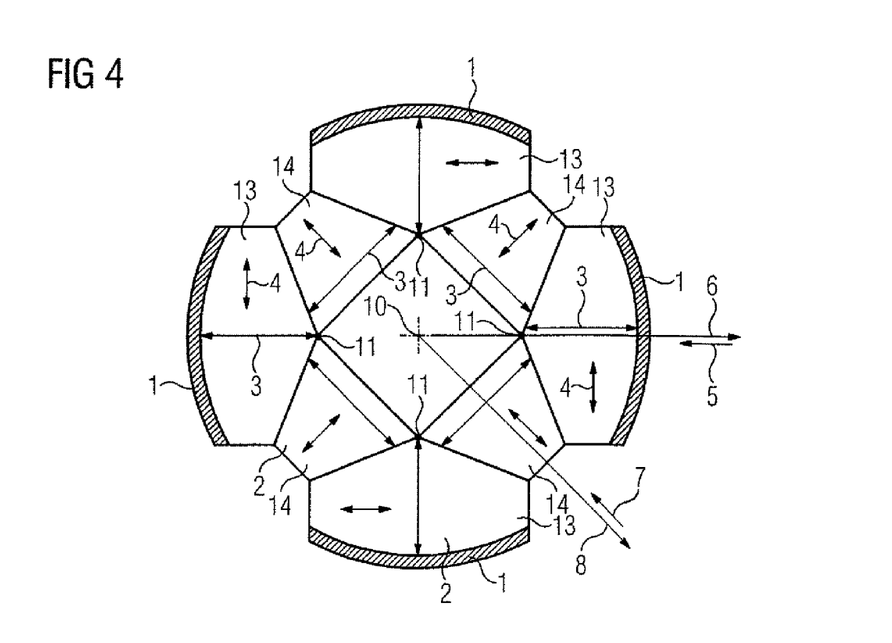
FIG. 4 is a cross section view of a fourth exemplary embodiment of a rotor according to the invention.

FIG. 4 shows a cross section of a fourth exemplary embodiment of the rotor according to the invention. The rotor is rotatable about an axis of rotation 10 and has a plurality of permanent magnets 1 on its radial outer surface for forming two magnetic pole pairs. Radially further inward from the plurality of permanent magnets 1, the rotor has an anisotropically-soft sintered magnetic material 2 having an easy direction 3 and a hard direction 4.

The rotor in FIG. 4 has respective pole areas 13 containing the anisotropically-soft sintered magnetic material 2, the respective pole area 13 located radially inwards from the permanent magnet 1 of a respective magnetic pole. The easy direction 3 of the anisotropically-soft sintered magnetic material 2 of the respective pole area 13 is oriented substantially along the respective d-axis 6.

In FIG. 4, respective intermediate areas 14 between respective pairs of consecutive pole areas 13 that follow each other in the circumferential direction, contain anisotropically-soft sintered magnetic material 2. The easy direction 3 of that anisotropically-soft sintered magnetic material 2 in the respective intermediate area 14 is oriented substantially perpendicular to the respective q-axis 8.

The respective pole area 13 having respective permanent magnets 1 preferably extends further outward in a radial direction than the respective intermediate area 14, as shown in FIG. 4. Consequently, a respective groove is formed between the respective pole areas 13 a circumferential direction.

Figure 5:
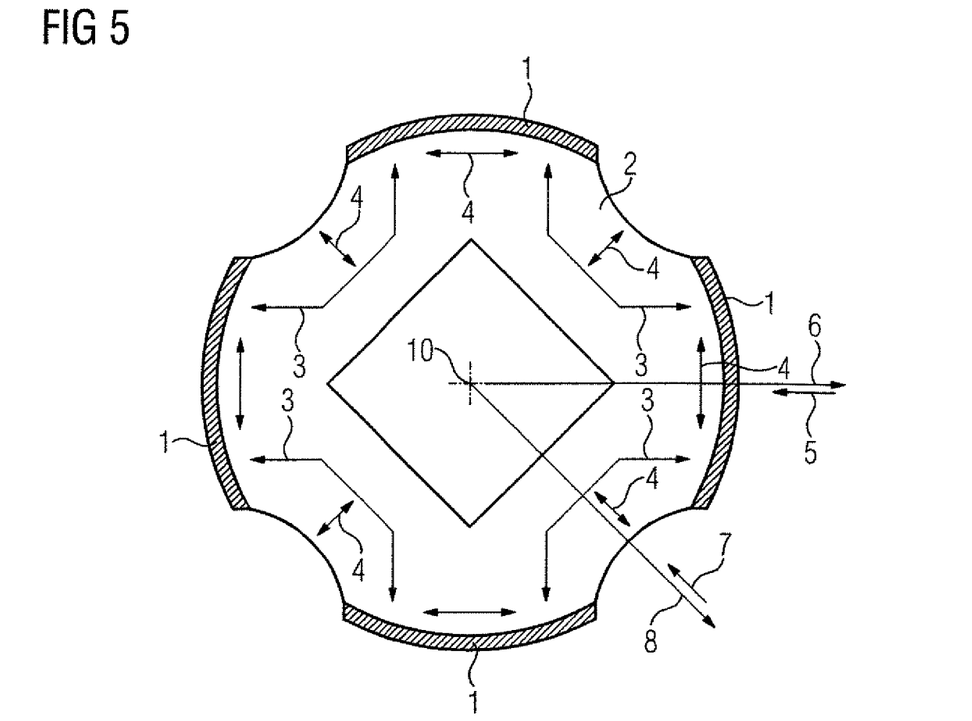
FIG. 5 is a cross section view of a fifth exemplary embodiment of a rotor according to the invention.

FIG. 5 shows a cross section of a fifth exemplary embodiment of the rotor according to the invention. The fifth exemplary embodiment has some similarities with the fourth exemplary embodiment. In the fifth embodiment of the rotor, the respective pole areas 13 and intermediate areas 14 are not strictly separate from one another, but rather merge with one another. Thus, the anisotropically-soft sintered magnetic material 2 is configured such that the easy direction 3 between two adjacent magnetic poles also has a substantially continuous course. In this example, the respective easy direction 3 runs in the area of the respective q-axis 8, substantially perpendicular to the respective q-axis 8, and passes across the respective d-axis 6 into an orientation in which the easy direction 3 lies substantially along the respective d-axis 6.

In summary, the invention relates to a rotor for an electric machine that is rotatable about an axis of rotation. The rotor having a plurality of permanent magnets for forming at least one magnetic pole pair on the radial outer surface of the rotor, preferably two or more magnetic pole pairs. Furthermore the invention relates to an electric machine having this type of rotor. To reduce the armature reaction in an electric machine having a rotor of this type, in accordance with the invention, it is proposed that the rotor have radially further inwards from the plurality of permanent magnets, an anisotropically-soft sintered magnetic material, at least in sections, having an easy direction and a hard direction.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A rotor for an electric machine, said rotor mounted for rotation about an axis and comprising:
    a plurality of permanent magnets placed on a radial outer surface of the rotor for forming at least one magnetic pole pair; and
    an anisotropically-soft sintered magnetic material having an easy direction and a hard direction and located in at least one section of the rotor radially further inward than the plurality of permanent magnets, wherein the easy direction of the anisotropically-soft sintered magnetic material is oriented substantially perpendicular to a respective q-axis, at least in one section.

2. The rotor of claim 1, wherein the plurality of permanent magnets form two or more magnetic pole pairs.

3. The rotor of claim 1, wherein the anisotropically-soft sintered magnetic material and the plurality of permanent magnets are arranged such that a respective d-magnetic flux along a respective d-axis is strengthened and a respective q-magnetic flux along a respective q-axis is weakened.

4. The rotor of claim 1, wherein the easy direction of the anisotropically-soft sintered magnetic material is oriented substantially along a respective d-axis, at least in one section.

5. The rotor of claim 1, wherein the anisotropically-soft sintered magnetic material and the plurality of permanent magnets are arranged such that the easy direction of the anisotropically-soft sintered magnetic material is substantially perpendicular to a respective q-magnetic flux.

6. The rotor of claim 5, wherein the easy direction of the anisotropically-soft sintered magnetic material is substantially perpendicular to a respective q-magnetic flux at a place where the respective q-magnetic flux penetrates the anisotropically-soft sintered magnetic material and/or the rotor.

7. The rotor of claim 1, wherein the anisotropically-soft sintered magnetic material and the plurality of permanent magnets are arranged such that the easy direction of the anisotropically-soft sintered magnetic material is substantially parallel to a respective d-magnetic flux.

8. The rotor of claim 7, wherein the easy direction of the anisotropically-soft sintered magnetic material is substantially parallel to a respective d-magnetic flux at a place where the respective d-magnetic flux penetrates the anisotropically-soft sintered magnetic material and/or the rotor.

9. The rotor of claim 1, further comprising a substantially cylindrical inner part that comprises a soft magnetic material or an amagnetic material, said anisotropically-soft sintered magnetic material being arranged, starting from at least one permanent magnet of a respective magnetic pole, along a respective d-axis toward the inner part, with the easy direction of the anisotropically-soft sintered magnetic material being oriented substantially along the respective d-axis.

10. The rotor of claim 1, wherein the rotor is an n-pole rotor and the inner part has a cross section perpendicular to the axis of rotation, wherein the cross section of the inner part is substantially a 2n-cornered polygon, where n is greater than or equal to four, and the 2n-cornered polygon is a substantially regular n-cornered polygon in which the n corners have each been replaced by bevels, such that the resulting 2n-cornered polygon has n long sides and n short sides, and wherein the anisotropically-soft sintered magnetic material is arranged, starting from at least one permanent magnet of the respective magnetic poles, along a respective d-axis toward a respective long side of the inner part, so that the easy direction of the anisotropically-soft sintered magnetic material is oriented substantially along the respective d-axis.

11. The rotor of claim 1, wherein the rotor has n poles and the inner part has a cross section perpendicular to the axis of rotation, wherein, in cross section, the soft magnetic or amagnetic material of the inner part is arranged as a regular n-cornered polygon, where n is greater than or equal to four, such that a first connecting line from the axis of rotation to a respective vertex of the polygon of the inner part is oriented substantially along the respective d-axis, a respective magnetic pole being located radially outward from each vertex; the anisotropically-soft sintered magnetic material is arranged radially outward from a respective radial outer surface of the inner part as far as an at least one permanent magnet of the respective magnetic pole, the easy direction of the anisotropically soft magnetic sintered material between two adjacent vertices being oriented substantially along a respective second connecting line that connects the two adjacent vertices.

12. The rotor of claim 1, further comprising:
    a respective magnetic pole area having the anisotropically-soft sintered magnetic material, wherein the respective magnetic pole area is arranged in a radial direction, radially inward from an at least one permanent magnet of a respective magnetic pole, wherein the easy direction of anisotropically-soft sintered magnetic material of the respective pole area is oriented substantially along the respective d-axis; and
    an intermediate area having the anisotropically-soft sintered magnetic material arranged between two pole areas, the two pole areas being consecutively one after the other in the circumferential direction, wherein the easy direction of the anisotropically-soft sintered magnetic material is oriented substantially perpendicular to the respective q-axis.

13. The rotor of claim 1, wherein the anisotropically soft sintered magnetic material includes one or more wire bundles.

14. The rotor of claim 1, wherein the anisotropically soft magnetic sintered material has a saturation flux density of at least 1 T.

15. The rotor of claim 1, wherein the anisotropically soft magnetic sintered material has a maximum coercive field strength of 10 kA/m.

16. The rotor of claim 1 wherein the anisotropically soft magnetic sintered material has a maximum coercive field strength of 1 kA/m.

17. The rotor of claim 1, wherein the anisotropically soft magnetic sintered material has along the easy direction a magnetic permeability which is greater by at least one order of magnitude than the magnetic permeability of the anisotropically soft magnetic sintered material along the hard direction.

18. The rotor of claim 1, wherein the anisotropically soft magnetic sintered material has along the easy direction a magnetic permeability $\mu r_L$ which is greater by at least two orders of magnitude than a magnetic permeability $\mu r_S$ of the anisotropically soft magnetic sintered material along the hard direction, wherein $\mu r_L$ is greater than 20 and $\mu r_S$ is less than 1.6.

19. The rotor of claim 1, wherein the anisotropically soft magnetic sintered material comprises neodymium-iron-boron, in particular soft magnetic neodymium-iron-boron.

20. An electric machine, comprising:
    a stator; and
    a rotor rotatable about an axis of rotation and mounted for magnetic interaction with the stator, said rotor having a radial outer surface and a plurality of permanent magnets placed on the radial outer surface of the rotor to form at least one magnetic pole pair, and an anisotropically-soft sintered magnetic material having an easy direction and a hard direction and located in the rotor, at least in one section thereof, radially further inward than the plurality of permanent magnets, wherein the easy direction of the anisotropically-soft sintered magnetic material is oriented substantially perpendicular to a respective q-axis, at least in one section.

* * * * *